United States Patent [19]

Schoenfelder

[11] 4,203,420
[45] May 20, 1980

[54] PORTABLE SOLAR HEAT TUBE

[76] Inventor: James L. Schoenfelder, 415 5th St., Coralville, Iowa

[21] Appl. No.: 854,667

[22] Filed: Nov. 25, 1977

[51] Int. Cl.$^2$ .............................................. F24J 3/02
[52] U.S. Cl. ...................................... 126/426; 34/93; 285/260; 126/443; 126/450
[58] Field of Search ............... 126/270, 271; 237/1 A; 34/93; 285/260

[56] References Cited

U.S. PATENT DOCUMENTS

| | | | |
|---|---|---|---|
| 2,371,629 | 3/1945 | Lee ....................... | 126/270 |
| 3,125,091 | 3/1964 | Sleeper, Jr. ............ | 126/271 |
| 3,859,980 | 1/1975 | Crawford .............. | 126/271 |
| 3,894,345 | 7/1975 | Zeltmann ................ | 34/93 |
| 3,908,631 | 9/1975 | Rom ....................... | 126/270 |
| 3,919,784 | 11/1975 | Tonn ........................ | 34/93 |
| 3,976,508 | 8/1976 | Mlavsky ................ | 126/271 |
| 4,015,582 | 4/1977 | Liu et al. ............... | 126/270 |
| 4,015,961 | 4/1977 | Howard et al. ......... | 285/260 |

FOREIGN PATENT DOCUMENTS

1098702  1/1968  United Kingdom ...................... 285/260

*Primary Examiner*—James C. Yeung

*Attorney, Agent, or Firm*—Zarley, McKee, Thomte, Voorhees & Sease

[57] ABSTRACT

A portable solar heat tube comprising an outer flexible tubular member having high solar transmittance capabilities and a flexible insulating tubular member positioned within the outer tubular member. A flexible absorber tubular member is positioned within the insulation tubular member for converting the incoming sunlight into heat and transferring the heat to the air passing therethrough. One end of the absorber tubular member is connected to a source of air under pressure with the other end thereof being connected to the installation requiring heat. A modified form of the solar heat tube includes a flexible header positioned within the absorber tubular member. The flexible header has a diameter somewhat smaller than the absorber tubular member so that a space will be provided therebetween. The header tubular member is provided with perforations formed in its exterior surface so that air entering the header will be discharged outwardly through the perforations therein to provide improved absorber-air contact. Apparatus is provided for maintaining the solar heat tube in position when inflated. The solar heat tube may be rolled up when deflated for storage or for movement from one location to another.

3 Claims, 11 Drawing Figures

PORTABLE SOLAR HEAT TUBE

BACKGROUND OF THE INVENTION

This invention relates to a portable solar heat tube and more particularly to an inflatable portable solar heat tube which may be rolled for storage or transportation.

Inflatable solar heat tubes have been previously proposed but most of them are attached to large rigid rectangular frames or are tubular configurations which are difficult to erect, inflexible and inefficient.

Therefore, it is a principal object of the invention to provide a portable solar heat tube.

A further object of the invention is to provide an inflatable portable solar heat tube.

A still further object of the invention is to provide a portable solar heat tube having improved efficiency.

A stiff further object of the invention is to provide a portable solar heat tube which is easily erected.

A still further object of the invention is to provide a solar heat tube which may be rolled up for storage or for transportation purposes.

A still further object of the invention is to provide a portable solar heat tube including means for preventing the escape of heat collected therein.

A still further object of the invention is to provide a portable solar heat tube which is versatile.

A still further object of the invention is to provide a portable solar heat tube which is economical of manufacture, durable in use and refined in appearance.

These and other objects will be apparent to one skilled in the art.

DESCRIPTION OF THE PREFERRED EMBODIMENT

Figure 1:
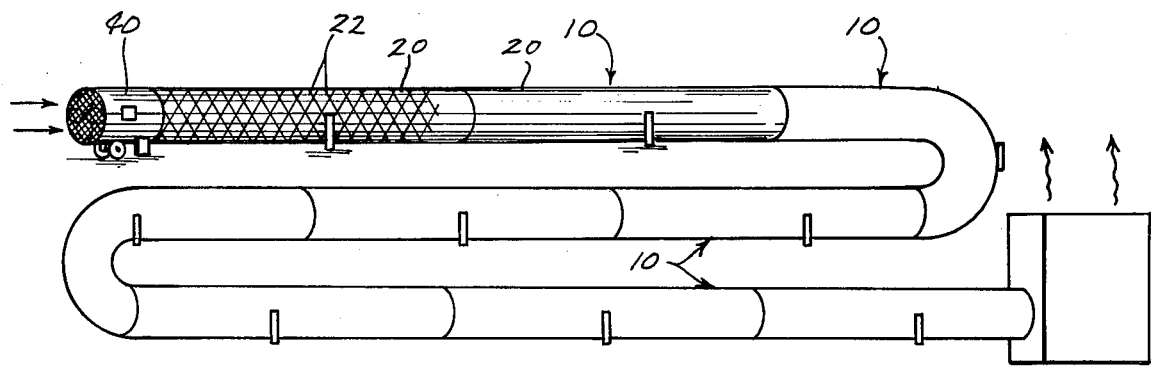
FIG. 1 is a perspective view of the invention.
Figures 2, 3:
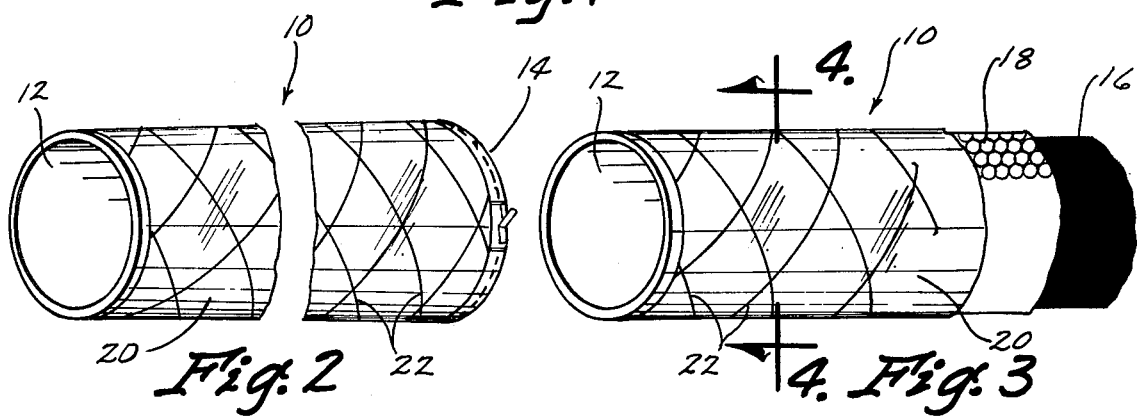
FIG. 2 is a partial perspective view of the invention.
FIG. 3 is a partial perspective view of the embodiment of FIG. 2 with portions thereof cut away to more clearly illustrate the invention.
Figures 4, 5:
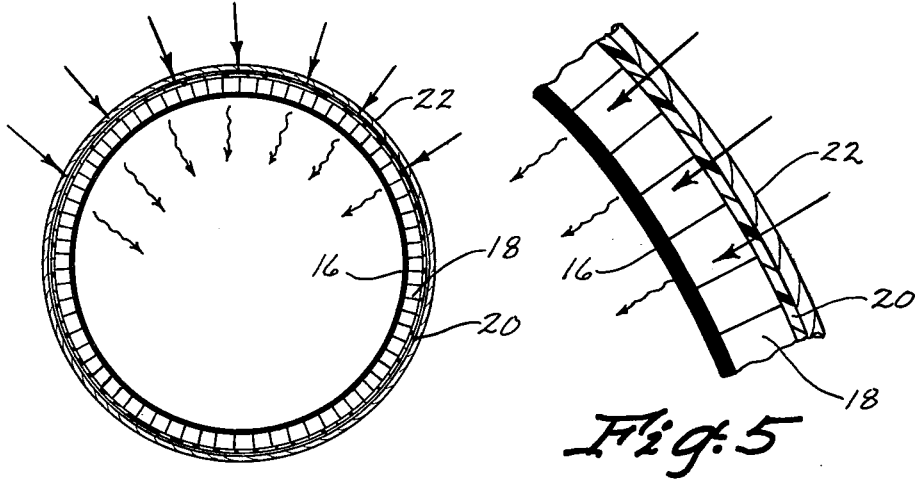
FIG. 4 is an enlarged sectional view as seen on lines 4—4 of FIG. 3.
FIG. 5 is a partial enlarged view of the view of FIG. 4.

The numeral 10 refers generally to the portable solar heat tube of this invention having an intake end 12 and a discharge end 14. The plurality of the tubes 10 may be detachably connected together as will be described hereinafter to achieve the necessary versatility. An example of a plurality of tubes secured together as seen in FIG. 1. Tube 10 comprises a black absorber tubular member 16 comprised of a flexible fabric or film. Absorber 16 may be comprised of polyethylene, polystyrene, vinyl, fiberglass, flexible fabric, Mylar, Tedlar, etc. The function of the absorber is to convert the incoming shortwave radiation (sunlight) to longwave radiation (heat) and subsequently transfer the heat to the working fluid (air).

An insulation tubular member 18 embraces absorber 16 and is preferably a material similar to that marketed under the trademark "Aircap" by Sealed Air Corporation. Insulation member 18 is preferably comprised of two clear thin plastic films which are vulcanized together with three-sixteenth inch high by five-sixteenth inch diameter air bubbles encased therebetween. Insulation tubular member 18 has high solar transmittance capabilities to permit sunlight into the tube and acts as an insulation, because of the air bubbles, which traps solar heat inside the tubular member 18.

A clear fabric or film tubular member 20 embraces tubular member 18 and has high solar transmittance capabilities. Tubular member 20 permits the sunlight to enter the interior of the tube and also serves as a protective coating for the insulating bubble pack beneath. Tubular member 20 may be comprised of polyethylene, polystyrene, vinyl, clear fiberglass, flexible fabric, Mylar, Tedlar, or other clear flexible film or fabric. Considerations other than solar transmittance for tubular member 20 would be weatherability and resistance to ultraviolet deterioration.

The tube 10 is preferably covered with a loose weave (approximately twelve-inch open weave) netting 22. Netting 22 is used to tie down the tube in a certain configuration and to keep it from being blown about by the wind. Bunge cord or similar tiedowns could be used but the netting 22 will give more uniform support along the entire length of the tube. Netting 22 may be a synthetic such as nylon or a natural material as long as it weathers well.

Figure 6:
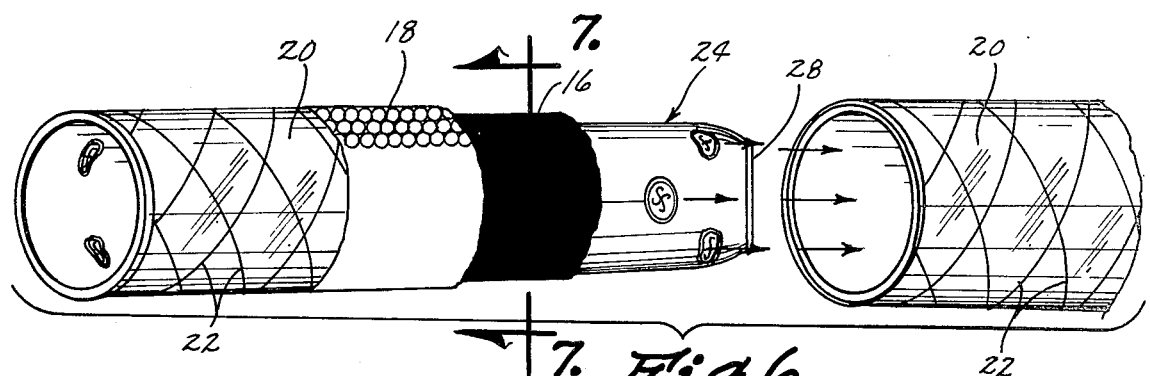
FIG. 6 is a perspective view of a modified form of the invention with portions thereof cut away.
Figures 7, 8:
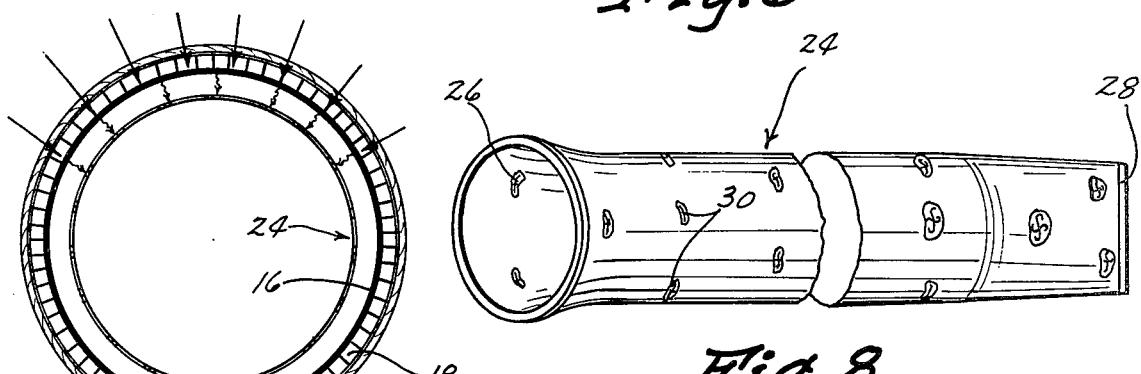
FIG. 7 is a sectional view as seen on lines 7—7 of FIG. 6.
FIG. 8 is a partial perspective view of the header employed in the embodiment of FIG. 6.

The modified form of the invention seen in FIG. 6 includes a perforated inflatable header 24 having an open end 26 and a tapered and sealed end 28. Header 24 is provided with a plurality of perforations 30 formed in the exterior surface thereof to permit the passage of air outwardly therethrough. Header 24 has a diameter slightly smaller than absorber 16 to create approximately a three inch air chamber therebetween referred to generally by the reference numeral 31.

Figures 9, 10:
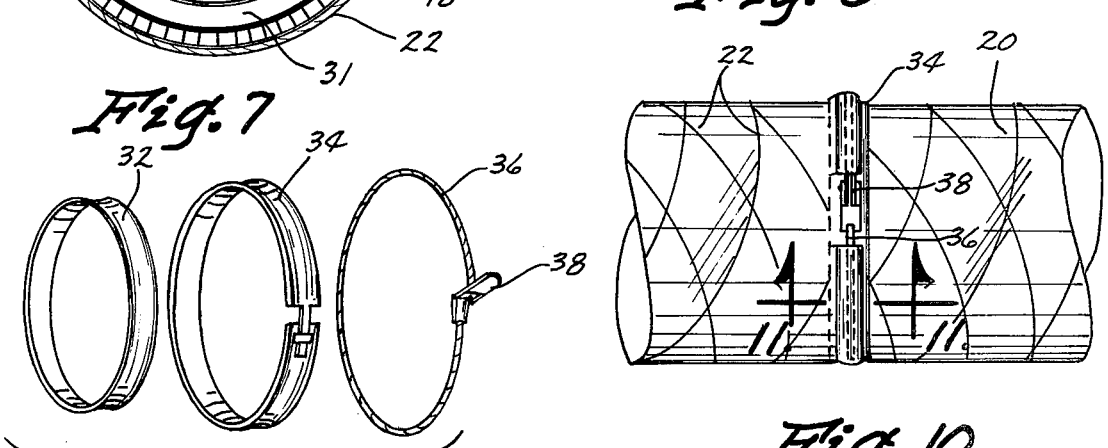
FIG. 9 is a perspective view of the connection means at one end of the tube.
FIG. 10 is a partial side view illustrating a pair of the tubes connected together.
Figure 11:
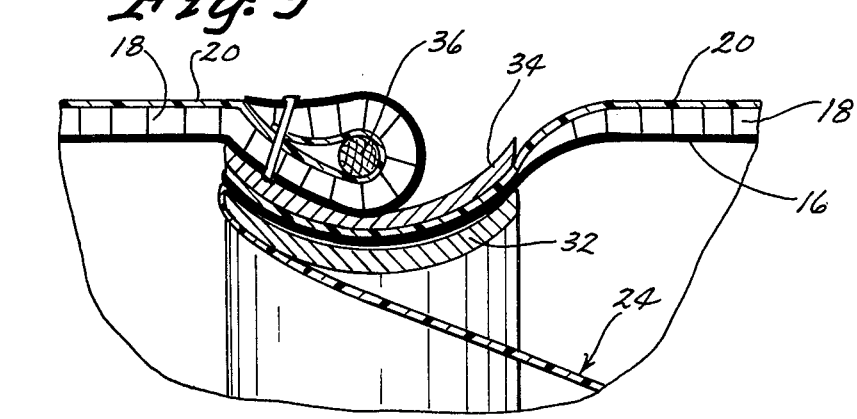
FIG. 11 is an enlarged sectional view as seen on lines 11—11 of FIG. 10.

As seen in FIGS. 9 and 11, the various tubular members comprising the tube 10 are secured together at their intake ends by means of an inner ring 32 and outer strap 34 positioned as seen therein. Preferably, inner ring 32 is comprised of metal or a high density, high strength plastic. The ring 32 is formed with a concave outer circumference as illustrated. The netting 22, tubular member 20, tubular member 18, tubular member 16 and header 24 are attached to the outer circumference of the ring 32 by an appropriate epoxy or Neoprene. To ensure a solid permanent connection, the feltlike strap 34 conforms to the concave contour of the ring 32 thereby providing a seat for the opposite end of another tube to be fastened thereto. The discharge or opposite end of the tube, except for the sealed end of the header 24, is wrapped around a flexible cable 36. Cable 36 may be a fibrous organic, synthetic or metal material; however, nylon rope is preferred. A lever type connector 38 is employed to clamp the discharge end of the tube to the rigid intake end of another tube. In this manner, several lengths of solar tube may be fastened together to give more or less heat output as the job requires.

In use, if more than one solar heat tube 10 is required, a plurality of same are connected together as previously described. The intake end of the tube is operatively connected to a source of air under pressure such as a coaxial fan 40 or a grain dryer fan such as seen in FIG. 1. The discharge end of the tube is operatively connected to the installation requiring heat such as a grain storage facility, building, etc. The netting 22 is employed to prevent the tube from being blown about by the wind and serves to maintain the configuration of the tube. The air entering the intake end of the tube enters the header 24 to inflate the same due to the tapered and closed end 28 thereof. The air within header 24 passes outwardly through the perforations 30 to inflate the tubular members embracing the same. As previously stated, the diameter of header 24 is slightly smaller than the absorber tubular member so that the air chamber 31 is defined therebetween. The sunlight passes through the outer tubular member 20 and passes through the insulation tubular member 18. The black absorber tubular member 16 converts the incoming shortwave radiation (sunlight) to longwave radiation (heat), and subsequently transfers the heat to the working fluid (air) contained in the air chamber 31 between the absorber 16 and header 24. The insulation tubular member 18 has a high solar transmittance to allow sunlight to pass therethrough and to act as a heat insulator, because of the air bubbles, to trap the solar heat within the tube. The header 24 maintains the air in intimate contact with the interior of the absorber tubular member 16 to increase air contact therewith so that greatly increased efficiency is achieved. In some cases, it is permissible to omit the absorber tubular member 24 but a reduction in efficiency is experienced when the absorber tubular member is omitted.

The air in the chamber 31 is either supplied to the next adjacent heat tube or to the installation requiring heat depending on the relative position of the tube. When the heat tube is no longer required, the system may be easily disassembled and rolled up for storage and transportation purposes.

Thus it can be seen that a novel portable solar heat tube has been provided which accomplishes at least all of its stated objectives.

I claim:

1. In combination,
   a flexible and inflatable portable solar heat tube having intake and discharge ends,
   said solar heat tube having a cylindrical configuration,
   the intake end of said heat tube being operatively connected to a source of air for moving air through said heat tube,
   the discharge end of said heat tube being operatively connected to an installation requiring heat,
   said heat tube comprising a first flexible outer tubular member having high solar transmittance capabilities; a second flexible tubular member positioned within said first tubular member and having heat insulation qualitites; and a flexible absorber tubular member positioned within said second flexible tubular member,
   said first flexible outer tubular member being in direct contact with said second tubular member about substantially the entire circumference thereof and said second flexible tubular member being in direct contact with said flexible absorber tubular member about substantially the entire circumference thereof,
   said absorber tubular member adapted to convert the incoming sunlight into heat and transfer the heat to the air passing through said heat tube.

2. The combination of claim 1 wherein a flexible netting material embraces said heat tube.

3. In combination,
   a flexible and inflatable portable solar heat tube having intake and discharge ends,
   the intake end of said heat tube being operatively connected to a source of air for moving air through said heat tube,
   the discharge end of said heat tube being operatively connected to an installation requiring heat,
   said heat tube comprising a first flexible outer tubular member having high solar transmittance capabilities; a second flexible tubular member positioned within said first tubular member and having heat insulation qualities; and a flexible absorber tubular member positioned within said second flexible tubular member,
   said absorber tubular member adapted to convert the incoming sunlight into heat and transfer the heat to the air passing through said heat tube,
   a flexible header tube positioned within said absorber tubular member and has a smaller diameter than said absorber tubular member to create an air chamber therebetween, said header tube having an open intake end in communication with the source of air and a sealed opposite end, said header tube having perforations formed therein whereby air entering said header tube will inflate said header tube and will pass outwardly through said perforations into said air chamber, said air chamber being in operative communication with said installation requiring heat.

* * * * *